(12) United States Patent
Iriyama

(10) Patent No.: US 9,831,526 B2
(45) Date of Patent: Nov. 28, 2017

(54) LITHIUM SECONDARY BATTERY

(71) Applicant: NEC Corporation, Tokyo (JP)

(72) Inventor: Jiro Iriyama, Tokyo (JP)

(73) Assignee: NEC Corporation, Tokyo (JP)

( * ) Notice: Subject to any disclaimer, the term of this patent is extended or adjusted under 35 U.S.C. 154(b) by 100 days.

(21) Appl. No.: 14/439,743

(22) PCT Filed: Oct. 29, 2013

(86) PCT No.: PCT/JP2013/079279
§ 371 (c)(1),
(2) Date: Apr. 30, 2015

(87) PCT Pub. No.: WO2014/069460
PCT Pub. Date: May 8, 2014

(65) Prior Publication Data
US 2015/0303518 A1 Oct. 22, 2015

(30) Foreign Application Priority Data
Oct. 30, 2012 (JP) ................................ 2012-239623

(51) Int. Cl.
*H01M 10/0567* (2010.01)
*H01M 10/04* (2006.01)
*H01M 10/052* (2010.01)
*H01M 10/44* (2006.01)
*H01M 4/36* (2006.01)
*H01M 4/583* (2010.01)
*H01M 4/133* (2010.01)
*H01M 4/1393* (2010.01)
*H01M 4/04* (2006.01)
*H01M 4/587* (2010.01)
*H01M 10/058* (2010.01)
*H01M 10/0525* (2010.01)
*H01M 4/02* (2006.01)

(52) U.S. Cl.
CPC ..... *H01M 10/0567* (2013.01); *H01M 4/0445* (2013.01); *H01M 4/133* (2013.01); *H01M 4/1393* (2013.01); *H01M 4/366* (2013.01); *H01M 4/583* (2013.01); *H01M 4/587* (2013.01); *H01M 10/04* (2013.01); *H01M 10/052* (2013.01); *H01M 10/058* (2013.01); *H01M 10/0525* (2013.01); H01M 10/446 (2013.01); H01M 2004/021 (2013.01); H01M 2004/027 (2013.01); H01M 2300/0025 (2013.01)

(58) Field of Classification Search
CPC ............. H01M 4/133; H01M 10/0567; H01M 4/0445; H01M 4/366; H01M 4/587; H01M 10/052; H01M 10/0525; H01M 10/058; H01M 4/583; H01M 10/04; H01M 4/1393; H01M 2300/0025; H01M 2004/021; H01M 2004/027; H01M 10/446
See application file for complete search history.

(56) References Cited

U.S. PATENT DOCUMENTS

| 5,750,282 | A | 5/1998 | Chi et al. | |
|---|---|---|---|---|
| 6,436,582 | B1 | 8/2002 | Hamamoto et al. | |
| 2004/0043300 | A1 | 3/2004 | Utsugi et al. | |
| 2006/0292452 | A1 | 12/2006 | Utsugi et al. | |
| 2007/0054179 | A1* | 3/2007 | Kusachi ............ | H01M 10/0525 429/65 |
| 2007/0117024 | A1* | 5/2007 | Nakai ................... | H01M 4/133 429/246 |
| 2012/0164525 | A1* | 6/2012 | Endoh .................. | H01M 4/131 429/203 |
| 2013/0011747 | A1* | 1/2013 | Sasaki .................... | C01B 31/02 429/336 |

FOREIGN PATENT DOCUMENTS

| CN | 1495959 A | 5/2004 |
|---|---|---|
| CN | 1757134 A | 4/2006 |
| CN | 1823436 A | 8/2006 |
| CN | 102324570 A | 1/2012 |
| EP | 1 394 888 A1 | 3/2004 |
| EP | 2 549 569 A1 | 1/2013 |
| EP | 2 827 433 A1 | 1/2015 |
| JP | 5-299122 | 11/1993 |
| JP | 11-506867 | 6/1999 |
| JP | 2000-123880 | 4/2000 |
| JP | 2000-133304 | 5/2000 |
| JP | 2000-323124 | 11/2000 |
| JP | 2004-281368 | 10/2004 |
| JP | 2006-324194 | 11/2006 |
| JP | 2007-141733 | 6/2007 |

(Continued)

OTHER PUBLICATIONS

Extended European Search Report mailed Apr. 14, 2016, by the European Patent Office in counterpart European Patent Application 13852173.7.
Office Action mailed Jul. 28, 2016, by the Chinese Patent Office in counterpart Chinese Patent Application 201380057421.1.
X. Zuo et al., "Electrochemical Reduction of 1,3-Propane Sultone on Graphite Electrodes and Its Application in Li-Ion Batteries", Electrochemical and Solid-State Letters 9 (4) A196-A199, 2006.
International Search Report mailed Feb. 10, 2014 in corresponding PCT International application.
Korean Office Action mailed Mar. 31. 2016 by the Korean Patent Office in counterpart Korean Patent Application 2015-7014232.

(Continued)

*Primary Examiner* — Muhammad Siddiquee
(74) *Attorney, Agent, or Firm* — Finnegan, Henderson, Farabow, Garrett & Dunner, L.L.P.

(57) ABSTRACT

The present invention provides a lithium secondary battery, wherein a peak at 167 to 171 eV and a peak at 160 to 164 eV are present in XPS analysis of sulfur on a negative electrode surface (S2p), and P169/P162 is in the range of 0.7 to 2.0 wherein the P169/P162 is the ratio between the intensity of the peak at 167 to 171 eV (P169) and the intensity of the peak at 160 to 164 eV (P162).

4 Claims, 2 Drawing Sheets

(56) References Cited

FOREIGN PATENT DOCUMENTS

| | | |
|---|---|---|
| JP | 2012-142155 A | 7/2012 |
| WO | WO 2005/029613 A1 | 3/2005 |
| WO | WO 2011/115247 A1 | 9/2011 |

OTHER PUBLICATIONS

Notification of the Third Office Action dated Sep. 13, 2017, by the People's Republic of China Patent Office in counterpart Chinese Patent Application 201380057421.1.
Decision of Refusal dated Oct. 17, 2017, by Japanese Patent Office in counterpart Japanese Patent Application 2014-544521.

* cited by examiner

LITHIUM SECONDARY BATTERY

CROSS-REFERENCE TO RELATED PATENT APPLICATIONS

This application is a National Stage Entry of International Application No. PCT/JP2013/079279, filed Oct. 29, 2013, which claims priority from Japanese Patent Application No. 2012-239623, filed Oct. 30, 2012. The entire contents of the above-referenced applications are expressly incorporated herein by reference.

TECHNICAL FIELD

The present invention relates to a lithium secondary battery.

BACKGROUND ART

A various types of lithium secondary batteries have been proposed up to now. For example, Patent Literature 1 discloses a non-aqueous electrolyte secondary battery comprising a substance having a peak from 162.9 to 164.0 eV by XPS analysis on the negative electrode surface, wherein when peak division of the photoelectron spectrum by XPS analysis on the negative electrode surface is performed; the ratio (Cc/Cs) between the carbon concentration Cc (atom %) and the sulfur concentration Cs (atom %) is 5 or more and 50 or less; and the ratio ($Cs_{164}$/Cs) between the sulfur concentration Cs (atom %), and the concentration $Cs_{164}$ of the substance having a peak from 162.9 to 164.0 eV (atom %) is 0.001 or more and 0.2 or less; the substance having a peak from 162.9 to 164.0 eV comprises a decomposed substance of a compound represented by the formula (1); and further, the electrolyte comprises a sultone compound represented by the formula (2) at a concentration of 0.005% by mass or more and 10% by mass or less.

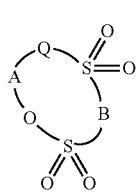

(1)

wherein Q represents an oxygen atom, methylene group, or a C—S single bond; A represents substituted or unsubstituted alkylene group having 1 to 5 carbon atoms; carbonyl group; sulfinyl group; substituted or unsubstituted fluoroalkylene group having 1 to 6 carbon atoms; or divalent group having 2 to 6 carbon atoms in which a plurality of alkylene units, a plurality of fluoroalkylene units, or an alkylene unit and a fluoroalkylene unit are bonded through an ether bond; and B represents substituted or unsubstituted alkylene group; substituted or unsubstituted fluoroalkylene group; or an oxygen atom.

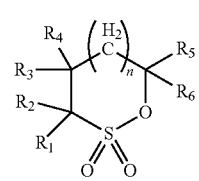

(2)

wherein n represents an integer of 0 or more and 2 or less; and $R_1$ to $R_6$ each independently represent a hydrogen atom, alkyl group having 1 or more and 12 or less carbon atoms, cycloalkyl group having 3 or more and 6 or less carbon atoms, or aryl group having 6 or more and 12 or less carbon atoms.

Patent Literature 2 discloses a non-aqueous secondary battery, wherein the positive electrode consists of a 4-V class active material, and a substance having a peak at 55.0 eV and also a peak at 168.6 eV in XPS analysis is present on the negative electrode surface. The literature describes that the peak at 55.0 eV is assigned to a lithium sulfur compound, a peak at 168.6 eV forms a film having a $SO_2$ bond, and the film having a $SO_2$ bond is stable and ion conductive, and has an effect of suppressing decomposition of the electrolyte.

Also, Non Patent Literature 1 suggests a compound comprising an $SO_x$ structure as shown in FIG. 1 as a reaction product of 1,3-propanesultone on the carbon negative electrode.

CITATION LIST

Patent Literature

Patent Literature 1: International Publication WO No. 2005/029613
Patent Literature 2: Japanese Patent Laid-Open No. 2000-123880

Non Patent Literature

Non-Patent Literature 1: Electrochemical and Solid-State Letters, 9(4) A196-A199 (2006)

SUMMARY OF INVENTION

Technical Problem

However, in films including a large amount of a compound having the $SO_x$ structure as described above, reduction in the capacity associated with battery charge/discharge cycle, particularly reduction in the capacity associated with battery charge/discharge cycle at high temperatures (for example, at about 45° C. or more) is significant, and further improvement of batteries having excellent cycle characteristics has been required.

Solution to Problem

The present embodiment relates to a lithium secondary battery, wherein a peak at 167 to 171 eV and a peak at 160 to 164 eV are present in XPS analysis of sulfur (S2p) of a negative electrode surface, and P169/P162, is in the range of 0.7 to 2.0 wherein the P169/P162 is the ratio between the intensity of the peak at 167 to 171 eV (P169) and the intensity of the peak at 160 to 164 eV (P162).

Advantageous Effects of Invention

The present embodiment can provide a lithium secondary battery having excellent cycle characteristics.

DESCRIPTION OF EMBODIMENTS

The lithium secondary battery of the present invention includes a film comprising sulfur formed on its negative electrode surface. On the negative electrode surface, the XPS spectrum of sulfur (S2p) has a peak at 167 to 171 eV (hereinafter, may be referred to as "a peak around 169 eV") and a peak at 160 to 164 eV (hereinafter, may be referred to as "a peak around 162 eV"), and a ratio between the intensity of the peak at 167 to 171 eV (P169) and the intensity of the peak at 160 to 164 eV (P162), P169/P162, is in the range of 0.7 to 2.0. The peak at 160 to 164 eV (the peak around 162 eV) herein is derived from sulfur having a sulfide structure, and the peak at 167 to 171 eV (the peak around 169 eV) is derived from sulfur assigned to $SO_x$. The present inventors have found that a lithium battery having excellent cycle characteristics can be obtained when (P169/P162) is in the range of 0.7 to 2.0 in the XPS spectrum of sulfur on the negative electrode surface. Herein, the bonding energy in the XPS spectrum is shown as a value standardized using F1s peak derived from LiF as 684.7 eV.

<Battery Structure>

The structure of the lithium secondary battery according to the present embodiment is not particularly limited, and may be, for example, a structure in which an electrode element including a positive electrode and a negative electrode arranged to face each other, and an electrolyte solution are housed in an outer package. Examples of the shape of the secondary battery include, but are not particularly limited to, a cylindrical type, a flat wound rectangular type, a stacked rectangular type, a coin type, a flat wound laminate type, and a layered laminate type.

Figure 1:
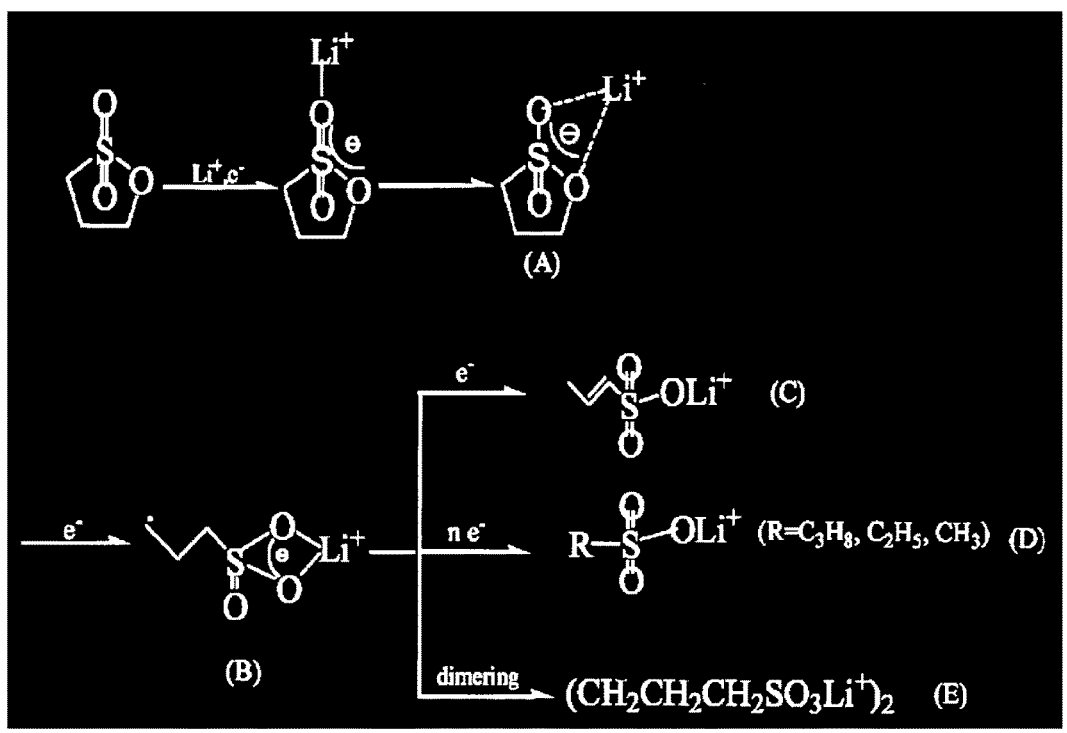
FIG. 1 is a reaction formula of 1,3-propanesultone on a carbon negative electrode described in Non Patent Literature 1.
Figure 2:
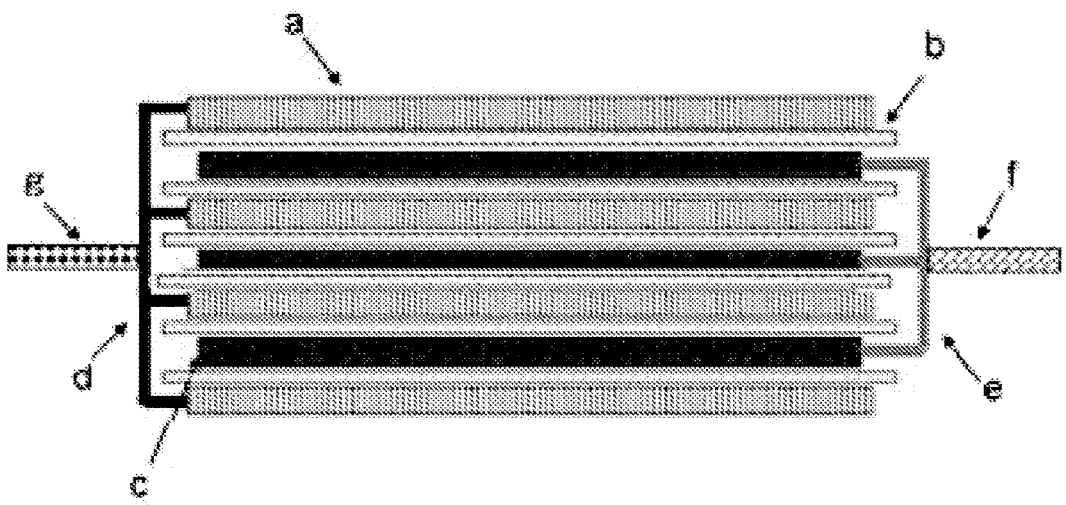
FIG. 2 is a schematic diagram of a laminate outer package battery.
Figure 3:
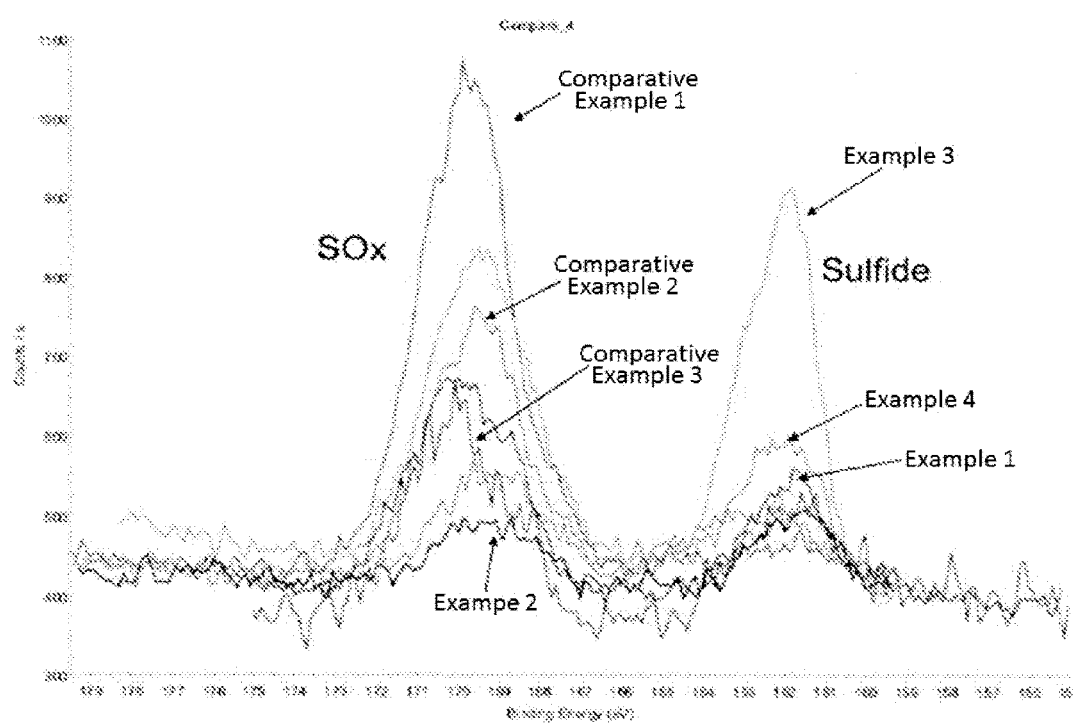
FIG. 3 is an example of an XPS spectrum (S2p) of a negative electrode surface.

By way of example, a layered laminate type secondary battery will be described below. FIG. 2 is a schematic cross sectional view showing a structure of an electrode element of a layered type secondary battery using a laminate film as its outer package. This electrode element is formed by stacking a plurality of positive electrodes c and a plurality of negative electrodes a with a separator b being interposed therebetween. The positive electrode current collector e provided in each the positive electrode c is welded and electrically connected to each other on the end which is not covered with a positive electrode active material, and further a positive electrode terminal f is welded to the welded portion. The negative electrode current collector d provided in each the negative electrode a is welded and electrically connected to each other on the end which is not covered with a negative electrode active material, and further, a negative electrode terminal g is welded to the welded portion.

<Electrolyte>

In the present embodiment, a liquid electrolyte (an electrolyte solution) is preferably used as an electrolyte.

In the lithium secondary battery of the present embodiment, the electrolyte solution preferably contains a sulfur compound as an additive. Examples of the sulfur compound include a cyclic disulfonic acid ester represented by the following formula (1), a sultone compound represented by the following formula (2), a γ-sultone compound (Japanese Patent Laid-Open No. 2000-235866), a sulfolene derivative (Japanese Patent Laid-Open No. 2000-29427), and the like.

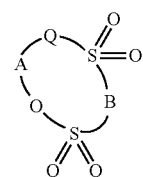

(1)

wherein Q represents an oxygen atom, methylene group, or a C—S single bond; A represents substituted or unsubstituted alkylene group having 1 to 5 carbon atoms; carbonyl group; sulfinyl group; substituted or unsubstituted fluoroalkylene group having 1 to 6 carbon atoms; or divalent group having 2 to 6 carbon atoms in which a plurality of alkylene units, a plurality of fluoroalkylene units, or an alkylene unit and a fluoroalkylene unit are bonded through an ether bond; and B represents substituted or unsubstituted alkylene group; substituted or unsubstituted fluoroalkylene group; or an oxygen atom.

When Q represents a C—S single bond in formula (1), the C (carbon atom) for the C—S bond is a part of A described above.

Examples of the cyclic disulfonic acid ester represented by the formula (1) include methylene methane disulfonate, ethylene methane disulfonate, and a compound described in International Publication No. WO 2005/029613.

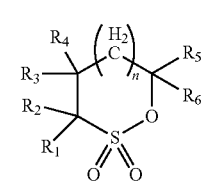

(2)

wherein n represents an integer of 0 or more and 2 or less; and $R_1$ to $R_6$ each independently represent a hydrogen atom, alkyl group having 1 or more and 12 or less carbon atoms, cycloalkyl group having 3 or more and 6 or less carbon atoms, or aryl group having 6 or more and 12 or less carbon atoms.

Specific examples of the compound represented by the formula (2) include 1,3-propanesultone, 1,4-butanesultone, and a γ-sultone compound (Japanese Patent Laid-Open No. 2000-235866). Among these, 1,3-propanesultone and 1,4-butanesultone are particularly preferred.

An example of other sulfur compound includes a sulfolene derivative (Japanese Patent Laid-Open No. 2000-294278) and the like.

In the present embodiment, the sulfur compound described above may be used singly or in combinations of two or more.

The content of the sulfur compound described above is not particularly limited, but is preferably 0.005% by mass or more and 5% by mass or less in the electrolyte solution. A content of the sulfur compound within said range allows a film to be formed more effectively on the negative electrode surface.

The electrolyte solution used in the present embodiment contains, but are not particularly limited to, an electrolyte salt and a non-aqueous electrolyte solvent in addition to the sulfur compound described above, for example.

Examples of the non-aqueous electrolytic solvent but are not particularly limited to include, from the viewpoint of the stability at the metal lithium potential, cyclic carbonates such as propylene carbonate, ethylene carbonate, butylene carbonate, and vinylene carbonate; linear carbonates such as dimethyl carbonate, diethyl carbonate, ethyl methyl carbonate, and dipropyl carbonate; and lactones such as γ-butyrolactone. The non-aqueous electrolytic solvent may be used singly or in combination of two or more.

Examples of the electrolyte salt include, but are not particularly limited to, lithium salts such as $LiPF_6$, $LiAsF_6$, $LiAlCl_4$, $LiClO_4$, $LiBF_4$, $LiSbF_6$, $LiCF_3SO_3$, $LiCF_3CO_2$, $Li(CF_3SO_2)_2$, and $LiN(CF_3SO_2)_2$. The electrolyte salt may be used singly or in combination of two or more.

An ionic liquid may also be used as an electrolyte solution. Examples of the ionic liquid include quaternary ammonium-imide salts.

Moreover, a gel electrolyte in which a polymer such as polyacrylonitrile or polyacrylate is impregnated with an electrolyte solution may be used.

<Negative Electrode>

A negative electrode can be prepared by, for example, mixing a negative electrode active material, an electric conductivity-imparting agent, and a negative electrode binder to prepare a negative electrode slurry, and coating the negative electrode slurry on a negative electrode collector to form a negative electrode active material layer.

One or more substances selected from the group consisting of, for example, lithium metal, lithium alloys, and materials capable of intercalating and deintercalating lithium may be used as the negative electrode active material. In the present embodiment, a carbon material, which is a material capable of intercalating and deintercalating lithium, is preferably included as a negative electrode active material.

Examples of the carbon material include carbon materials having a high surface crystallinity, graphite capable of intercalating lithium, amorphous carbon, diamond-like carbon, carbon nanotube, and the like. In the present embodiment, in particular, it is preferable to contain a carbon material having a high surface crystallinity. Examples of the carbon material having a high surface crystallinity include natural graphite, artificial graphite, vapor deposition carbon fiber, as well as composite carbon materials formed by coating the surface of a low crystallinity carbon material such as hard carbon or soft carbon with a high crystallinity carbon material such as artificial graphite. The crystallinity of the surface of carbon materials can be determined with a method such as microscopic Raman. The crystallinity of a carbon material surface can be evaluated by measuring a Raman spectrum of the carbon material surface (depth of 0.1 to 1.0 μm) with microscopic Raman and calculating the intensity ratio (Id/Ig) between two bands, i.e., D-band having a Raman shift of around 1350 $cm^{-1}$ and the G-band having a Raman shift of around 1582 $cm^{-1}$ in the spectrum. The crystallinity of the carbon material surface is higher as the intensity ratio is smaller. The range of the intensity ratio is preferably $0 \leq Id/Ig \leq 0.1$, more preferably $0 \leq Id/Ig \leq 0.02$. The content of the carbon material having a high surface crystallinity described above is preferably contained in, for example, 70% by mass or more (including 100% by mass) in the negative electrode active material.

Example of the negative electrode active material in the present embodiment include, in addition to, or instead of, the carbon materials having a high surface crystallinity described above, lithium alloys such as lithium-aluminum alloys, lithium-lead alloys, and lithium-tin alloys, lithium metal, Si, $SnO_2$, SnO, $TiO_2$, $Nb_2O_3$, SiO, and the like, or combinations of two or more thereof.

<Negative Electrode Collector>

A negative electrode collector is preferably a metal that does not form an alloy with Li. Examples of the metal include copper, nickel, alloys thereof, and the like. Examples of the shape of the collector include foil, a plate shape, and a mesh shape.

<Negative Electrode Binder>

Examples of the negative electrode binder that can be used include, but are not particularly limited to, polyvinylidene fluoride, vinylidene fluoride-hexafluoropropylene copolymers, vinylidene fluoride-tetrafluoroethylene copolymers, styrene-butadiene copolymer rubber, polytetrafluoroethylene, polypropylene, polyethylene, polyimide, polyamide-imide and the like. The amount of the negative electrode binder to be used is preferably 7 to 20 parts by mass based on 100 parts by mass of the negative electrode active material from the viewpoint of "a sufficient binding property" and "higher energy", which are in a trade-off relationship.

An example of the electric conductivity-imparting agent includes carbon black.

<Positive Electrode>

A positive electrode can be produced by mixing, for example, a positive electrode active material such as a lithium manganese composite oxide, a positive electrode binder, and a positive electrode electric conductivity-imparting agent as required to prepare a positive electrode slurry, and forming the positive electrode slurry on a positive electrode collector.

<Positive Electrode Active Material>

The positive electrode active material in the present embodiment is not particularly limited as long as it can deintercalate lithium ions in charging and intercalate them in discharging, and, for example, those known can be used. An example of the positive electrode active material is preferably a lithium transition metal oxide. Examples of the lithium transition metal oxide include, but are not particularly limited to, lithium manganate having a lamellar structure or lithium manganate having a spinel structure such as $LiMnO_2$, $LixMn_2O_4$ ($0<x<2$) and the like; $LiCoO_2$, $LiNiO_2$ and materials in which a part of the transition metal thereof are substituted with another metal; lithium transition metal oxides in which the molar ratio of a specific transition metal is not more than one half such as $LiNi_{1/3}Co_{1/3}Mn_{1/3}O_2$; materials which have an olivine structure such as $LiFePO4$; and materials which have Li at a larger amount than the stoichiometric amount in these lithium transition metal oxides. Particularly, $Li_\alpha Ni_\beta Co_\gamma Al_\delta O_2$ ($1 \leq \alpha \leq 1.2$, $\beta+\gamma+\delta=1$, $\beta \geq 0.7$, $\gamma \geq 0.2$) or $Li_\alpha Ni_\beta Co_\gamma Mn_\delta O_2$ ($1 \leq \alpha \leq 1.2$, $\beta+\gamma+\delta=1$, $\beta \geq 0.6$, $\gamma \leq 0.2$) is preferable. These materials may be used singly or in combination of two or more.

Examples of the positive electrode electric conductivity-imparting agent include, but are not particularly limited to, carbon materials. Examples of the carbon material include graphite, amorphous carbon, diamond-like carbon, carbon black, Ketjenblack, acetylene black, vapor deposition carbon fiber, fullerenes, carbon nanotubes, and composites thereof. These electric conductivity-imparting agents may be used singly, or may be used in combination of two or more. Besides, metal substances such as aluminum, electrically conductive oxide powders and the like can be used.

<Positive Electrode Binder>

Examples of the positive electrode binder that can be used include, but are not particularly limited to, polyvinylidene fluoride, vinylidene fluoride-hexafluoropropylene copolymers, vinylidene fluoride-tetrafluoroethylene copolymers, styrene-butadiene copolymer rubber, polytetrafluoroethylene, polypropylene, polyethylene, polyimide, polyamide-imide and the like. Among these, polyvinylidene fluoride (PVdF) is preferred from the viewpoint of versatility and low costs.

The content of the positive electrode binder in the positive electrode active material layer is preferably 1% by mass or more and 25% by mass or less, more preferably 2% by mass or more and 20% by mass or less, and still more preferably 5% by mass or more and 15% by mass or less. The content of 1% by mass or more can prevent electrode delamination from occurring. The content of 25% by mass or less can increase the ratio of the mass of the positive electrode active material, and thus can increase the capacity per mass.

<Positive Electrode Collector>

Preferable examples of the positive electrode collector include aluminum and alloys thereof from the viewpoint of electrochemical stability. Examples of the shape include foil, a plate shape, and a mesh shape.

<Separator>

The separator is not particularly limited, and known separators can be adopted. Examples of the separator that can be used include porous films or non-woven fabric of polypropylene, polyethylene and the like. Films such as polyimide or alamid, and cellulose films can also be used.

<Outer Package>

Any package may be used without particular limitation as long as it is stable to the electrolyte solution and has sufficient water vapor barrier properties. As the outer package, for example, metal cans of iron, aluminum alloys or the like, laminate films and the like can be used. Preferable laminate films are aluminum- and silica-deposited laminate films from the viewpoint of water vapor barrier properties.

In the present embodiment, a lithium secondary battery in which sulfur is present on its negative electrode surface and the intensity ratio (P169/P162) of the sulfur XPS spectrum (S2p) is in the range of 0.7 to 2.0 can be obtained by, for example, preparing a lithium secondary battery using an electrolyte solution containing the sulfur compound described above as an additive and a negative electrode containing a carbon material having a high surface crystallinity as the negative electrode active material, and then perform charging the battery in the temperature range of 39 to 65° C. Charging conditions are not particularly limited, but charging is preferably performed in the temperature range of 39 to 65° C., the upper limit voltage is preferably from 4.1 V to 4.3 V, and the charging mode is desirably CCCV mode, namely, a mode in which charging is performed at a constant current until the upper limit voltage is reached, and after the upper limit voltage being reached, the upper limit voltage is maintained while the current is reduced. The constant charging current until the upper limit voltage is reached is preferably in the range of 0.1 C to 0.5 C. The 0.1 C current herein refers to a current that, in the case where any of a fully charged battery is discharged at a constant current, requires 10 hours to allow the battery to be completely discharged, and 0.5 C refers to a current that requires 2 hours to allow the battery to be completely discharged. The charging period is preferably from 6 to 24 hours.

EXAMPLES

Specific examples according to the present embodiment will be described below, but the present embodiment is not limited to these examples.

Example 1

(Preparation of a Negative Electrode)

SG-BH (manufactured by Ito Graphite Co., Ltd) as a negative electrode carbon material, and PVDF (product name: "#2400", manufactured by KUREHA CORPORATION) as a negative electrode binder were mixed at a mass ratio of 93:7, and dispersed in n-methylpyrrolidone (NMP) to provide a slurry. The mass ratio between NMP and the solid content was 51:49. This slurry was applied on a copper foil having a thickness of 10 µm with a doctor blade, and then heated at 110° C. for 7 minutes to dry NMP, and thereby a negative electrode was obtained.

(Preparation of a Positive Electrode)

Lithium manganate (manufactured by NICHIA CORPORATION), carbon black (product name: "#3030B", manufactured by Mitsubishi Chemical Corporation), and polyvinylidene fluoride (product name: "#2400", manufactured by KUREHA CORPORATION) were each measured in a mass ratio of 95:2:3. These were mixed with NMP to form a slurry. The mass ratio between NMP and the solid content was 54:46. The slurry was applied on an aluminum foil having a thickness of 15 µm with a doctor blade. The aluminum foil with the slurry applied was heated at 120° C. for 5 minutes to dry NMP, and thereby a positive electrode was obtained.

(Assembly of a Secondary Battery)

The obtained positive electrode and negative electrode were respectively welded with an aluminum terminal and a nickel terminal. These were stacked with a separator interposed therebetween to produce an electrode element. The electrode element was packaged with a laminate film, and an electrolyte solution was injected inside the laminate film. Subsequently, the laminate film was sealed by heat fusion while reducing the pressure inside the laminate film. A plurality of flat secondary batteries before initial charging was thus produced. A polypropylene film was used as the separator. An aluminum-deposited polypropylene film was used as the laminate film. As the electrolyte solution, a solvent containing 1,3-propanesultone (3 wt %) as the additive, 1.0 mol/l of $LiPF_6$ as the electrolyte, and a mixed solvent of ethylene carbonate and diethyl carbonate (7:3 (volume ratio)) as the non-aqueous electrolytic solvent.

(Formation of a Surface Film on the Negative Electrode)

The secondary batteries produced were charged in a thermostatic chamber maintained at 45° C. The upper limit voltage was set to 4.2 V. Charging was performed in CCCV mode, and the voltage was maintained constant for an hour after it reached 4.2 V. The CC current was set to 0.2 C.

(Analysis of the Negative Electrode Surface)

After the secondary batteries produced were discharged to 3.0 V, one battery selected was disassembled under an argon atmosphere, and the negative electrode was cut out and introduced into an XPS analyzer without being exposed to the atmosphere. The results obtained in XPS analysis are shown in Table 1.

(Charge and Discharge Cycle Test of the Secondary Battery)

The secondary batteries produced were subjected to charge and discharge cycle test in a thermostatic chamber maintained at 45° C. The battery voltage was set in the range from 3.0 to 4.2 V, Charging was performed in CCCV mode, and the voltage was maintained constant for an hour after it reached 4.2 V. Discharging was performed in CC mode (at the constant current of 1.0 C). The 1.0 C current herein refers to a current that, in the case where any of a fully charged battery is discharged at a constant current, requires 1 hour to allow the battery to be completely discharged. The number of the charge and discharge cycle when a discharge capacity became 30% or less relative to the initial discharge capacity is shown in Table 1.

Example 2

Batteries were produced and subjected to XPS analysis and cycling test as in the same manner as Example 1 except that the negative electrode carbon material of Example 1, SG-BH, was replaced with surface-coated Carbotron P (a material obtained by coating the surface of Carbotron P (hard carbon manufactured by Kureha Corporation) with petroleum pitch, and subsequently baking it at 2800° C.), and the electrolyte solution additive, 1,3-propanesultone, was replaced with MMDS (methylene methane disulfonate).

Example 3

Batteries were produced and subjected to XPS analysis and cycle test as in the same manner as Example 1 except that the electrolyte solution additive of Example 1, 1,3-propanesultone, was replaced with 1,4-butanesultone, and the temperature for forming a surface film on the negative electrode was altered from 45° C. to 55° C.

Example 41

Batteries were produced and subjected to XPS analysis and cycling test as in the same manner as Example 1 except that the electrolyte solution additive of Example 1, 1,3-propanesultone, was replaced with MMDS, and the temperature for forming a surface film on the negative electrode was altered from 45° C. to 60° C.

Comparative Example 1

Batteries were produced and subjected to XPS analysis and cycle test as in the same manner as Example 1 except that the temperature for forming a surface film on the negative electrode was altered from 45° C. to 37° C.

Comparative Example 2

Batteries were produced and subjected to XPS analysis and cycle test as in the same manner as Example 1 except that the negative electrode carbon material of Example 1, SG-BH was replaced with Carbotron P (hard carbon manufactured by Kureha Corporation (amorphous carbon)).

Comparative Example 3

Batteries were produced and subjected to XPS analysis and cycle test as in the same manner as Example 1 except that the negative electrode carbon material of Example 1, SG-BH, was replaced with MCMB1300 (soft carbon manufactured by Osaka Gas Chemicals Co., Ltd. (amorphous carbon)).

The results of Examples and Comparative Examples described above are shown in Table 1.

TABLE 1

|  | Negative electrode carbon material | Electrolyte solution additive | Temperature at film formation (° C.) | P169/P162 | The number of the charge/discharge cycle when the discharge capacity became 30% or less relative to the initial discharge capacity |
|---|---|---|---|---|---|
| Ex. 1 | SG-BH | 1,3-propanesultone | 45 | 0.78 | 1245 |
| Ex. 2 | Surface-coated Carbotron P | MMDS | 45 | 0.98 | 2751 |
| Ex. 3 | SG-BH | 1,4-butanesultone | 55 | 1.62 | 1218 |
| Ex. 4 | SG-BH | MMDS | 60 | 1.82 | 1519 |
| Com-Ex. 1 | SG-BH | 1,3-propanesultone | 37 | 73 | 424 |
| Com-Ex. 2 | Carbotron P | 1,3-propanesultone | 45 | 32 | 1115 |
| Com-Ex. 3 | MCMB1300 | 1,3-propanesultone | 45 | 3.6 | 548 |

Ex. = Example
Com-Ex. = Comparative Example

As shown in Table 1, for the batteries of all Examples, the P169/P162 value is in the range of 0.7 to 2.0, and the number of the charge and discharge cycle that exhibited a discharge capacity of 30% or less relative to the initial discharge capacity is 1200 or more. In contrast, for the batteries of all Comparative Examples, the P169/P162 value is more than 2, and the number of the charge and discharge cycle that exhibited a discharge capacity of 30% or less relative to the initial discharge capacity is below 1200.

From this reason, it is assumed that by highly-crystallizing the surface of the negative electrode carbon material and allowing an additive to react at, for example, 45° C. or more, a film containing much sulfur having a sulfide structure can be formed on the negative electrode surface, and a lithium secondary battery having excellent charge and discharge cycle characteristics becomes more easily obtained.

EXPLANATION OF SYMBOLS a: negative electrode
b: separator
c: positive electrode
d: negative electrode collector
e: positive electrode collector
f: positive electrode terminal
g: negative electrode terminal

The invention claimed is:
1. A lithium secondary battery comprising:
a negative electrode comprising a carbon material comprising a composite carbon material formed by coating a surface of an amorphous carbon with artificial graphite, and
an electrolyte solution comprising methylene methane disulfonate, and
wherein a peak at 167 to 171 eV and a peak at 160 to 164 eV are present in XPS analysis of sulfur (S2p) of a negative electrode surface, and P169/P162 is in the range of 0.7 to 2.0 wherein the P169/P162 is the ratio between the intensity of the peak at 167 to 171 eV (P169) and the intensity of the peak at 160 to 164 eV (P162).

2. A method for producing a lithium secondary battery comprising a positive electrode, a negative electrode, and an electrolyte solution comprising methylene methane disulfonate, comprising:
 a step of producing an electrode element by arranging the positive electrode and the negative electrode to face each other; and
 a step of enclosing the electrode element, and the electrolyte solution comprising an additive comprising the methylene methane disulfonate, and a non-aqueous electrolytic solvent in an outer package, and performing charging;
 whereby a peak at 167 to 171 eV and a peak at 160 to 164 eV are present in XPS analysis of sulfur (S2p) of a negative electrode surface, and P169/P162 is in the range of 0.7 to 2.0 wherein the P169/P162 is the ratio between the intensity of the peak at 167 to 171 eV (P169) and the intensity of the peak at 160 to 164 eV (P162); and
 wherein the negative electrode comprises a carbon material comprising a composite carbon material formed by coating a surface of an amorphous carbon with artificial graphite.

3. The method of producing a lithium secondary battery according to claim 2, wherein the charging is performed at a temperature of 39° C. or more and constant charging current until the upper limit voltage is reached is in the range of 0.1 C to 0.5 C.

4. The lithium secondary battery according to claim 1, wherein the carbon material comprises a composite carbon material formed by coating a surface of hard carbon with artificial graphite.

* * * * *

UNITED STATES PATENT AND TRADEMARK OFFICE
CERTIFICATE OF CORRECTION

PATENT NO. : 9,831,526 B2
APPLICATION NO. : 14/439743
DATED : November 28, 2017
INVENTOR(S) : Iriyama It is certified that error appears in the above-identified patent and that said Letters Patent is hereby corrected as shown below:

In the Claims

Claim 1, Column 11, Line 1, insert a space between "167" and "to".

Signed and Sealed this
Twenty-fourth Day of April, 2018

Andrei Iancu
*Director of the United States Patent and Trademark Office*